United States Patent
Watanabe

(10) Patent No.: US 7,180,630 B2
(45) Date of Patent: Feb. 20, 2007

(54) PRINTER SYSTEM, PRINTER DRIVER AND PRINTER

(75) Inventor: Yoshio Watanabe, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 974 days.

(21) Appl. No.: 09/984,995

(22) Filed: Nov. 1, 2001

(65) Prior Publication Data
US 2002/0057443 A1 May 16, 2002

(30) Foreign Application Priority Data
Nov. 2, 2000 (JP) ............................ P2000-336027

(51) Int. Cl.
G06F 15/00 (2006.01)
G06K 1/00 (2006.01)

(52) U.S. Cl. ........................ 358/1.9; 358/1.16; 382/100
(58) Field of Classification Search ................ 358/1.15, 358/1.14, 1.9, 520, 1.16; 345/600; 382/140, 382/100
See application file for complete search history.

(56) References Cited

U.S. PATENT DOCUMENTS

| 5,917,994 | A | * | 6/1999 | Perumal et al. ............... 358/1.9 |
| 6,137,595 | A | * | 10/2000 | Sakuyama et al. ............ 358/1.9 |
| 6,226,011 | B1 | * | 5/2001 | Sakuyama et al. ........... 345/600 |
| 6,366,685 | B1 | * | 4/2002 | Takaragi ....................... 382/140 |
| 6,421,141 | B2 | * | 7/2002 | Nishikawa .................... 358/1.9 |
| 6,850,624 | B1 | * | 2/2005 | Shinoda et al. ............. 382/100 |
| 6,873,711 | B1 | * | 3/2005 | Murakami et al. ........... 382/100 |
| 6,879,416 | B2 | * | 4/2005 | Shimizu ....................... 358/520 |
| 6,891,638 | B1 | * | 5/2005 | Iizumi et al. ................. 358/1.9 |
| 7,002,704 | B1 | * | 2/2006 | Fan ............................ 358/1.16 |

FOREIGN PATENT DOCUMENTS

| EP | 1005224 | 5/2000 |
| JP | 10-224651 | 8/1998 |
| JP | 11-331596 | 11/1999 |
| JP | 2000-148973 | 5/2000 |
| JP | 2000-165690 | 6/2000 |

* cited by examiner

Primary Examiner—Kimberly Williams
Assistant Examiner—Satwant Singh
(74) Attorney, Agent, or Firm—Mattingly, Stanger, Malur & Brundidge, P.C.

(57) ABSTRACT

Attribute information X to be added to the printer data transmitted from a printer driver to a printer is expressed based on the color information of C, M, Y, K. The printer driver appropriately changes the attribute information X expressed based on the color information of C, M, Y, K so that the attribute information X, which is expressed based on the color information of C, M, Y, K, takes an appropriate value, and sends the printer data to the printer. Upon receipt of the printer data, the printer extracts the attribute information X based on the color information of C, M, Y, K of the printer data as received, and executes the printing according to the information.

9 Claims, 5 Drawing Sheets

PRINTER SYSTEM, PRINTER DRIVER AND PRINTER

BACKGROUND OF THE INVENTION

1. Field of the Invention

The present invention relates to a printer system including a printer driver for generating printer data from data on an object to be printed, and a printer for executing the printing of the printed object on the basis of the printer data. More particularly, the invention relates to a printer system including a printer driver capable of adding attribute information to the printer data and a printer capable of extracting the added attribute information from the printer data.

The present application is based on Japanese Patent Application No. Hei. 2000-336027, which is incorporated herein by reference.

2. Description of the Related Art

FIG. 6 is a block diagram showing a conventional printer system including host computer for sending a print request, and a printer for executing the printing in response to the print request. To execute the printing as instructed from the host computer 1, usually, the user first operates an application software 2 installed to the host computer 1 to enter necessary commands, such as formation or select of an object to be printed, e.g., images, characters, graphics, and a print request to request the printing of the printed object. In a simple example of this, the user forms a document by using a document processing software, and prints the document.

When a print command is issued, a process is executed under control of the application software 2, and data of objects (characters, images, graphics) contained in the printed object is transferred to a printer driver 3 installed to the host computer 1. The printer driver 3 is a software program which functions as an interface between the host computer 1 and the printer 5, and provided for each type of printer 5. The printer driver develops the data of the printed object as received into image data for the printer 5 associated with the printer driver. Specifically, the printer driver forms data consisting of a list of color information pieces each for one dot on a page to be printed (This data will be referred to as printer data.). In the color printing, the color information for each dot consists of color data of respective colors (C, M, Y, K or R, G, B).

Then, the printer data thus formed is transmitted through a transmission path 4, e.g., LAN (local area network), to the printer 5, and the printer 5 executes the printing of the printer data. In the printer 5, the controller 6 receives the printer data, and image processes the printer data (e.g., binarizes the printer data) into print commands for transfer to a print engine 7 for actually executing the printing, and issues the print commands in synchronism with the operation of the print engine 7. The print engine 7 operates in accordance with the print commands to execute the printing of the object to be printed.

By convention, the printing as instructed from the host computer 1 is executed by the system configuration and processing contents as mentioned above.

To execute the printing as instructed from the host computer 1, as described above, the color information pieces each for one dot are transmitted from the printer driver 3 to the controller 6 of the printer 5. To print by the color printer, the color data of the respective colors and given attribute information that is added for each dot to the printer data as well are frequently transmitted to the printer 5. In a case where dots to be printed are contained in the character and a case where those are contained in the image, even if the color information (color data of the respective colors), which are used for those cases, are one and the same, it is necessary to modify the binarizing process and the color conversion process, which are carried out by the controller 6, in order to secure an attractive print quality. This necessitates the transmission of image processing information (attribute information) used for the process modification, together with the color information, to the controller 6.

The color data is usually expressed by using 8 bits (0 to 255) per one color (one element). Accordingly, the color information is represented by using 32-bit data when it is expressed in terms of C, M, Y, K, and by using 24-bit data when it is expressed in terms of R, G, B. Other kinds of information are also expressed by using the data of 8 bits long.

Accordingly, in a case where the attribute information must be added to the printer data, when the attribute information is added to the 32-bit or 24-bit data of the color information, it must take the form of 8-bit data even if it consists of 1 bit. This results in increase of the amount of printer data. Hence, the load is increased in the transfer of data from the host computer 1 to the printer 5 and the data storage in the printer 5.

SUMMARY OF THE INVENTION

Accordingly, an object of the present invention is to provide a printer system which includes a printer driver capable of adding attribute information to the printer data without any increase of data amount, and a printer capable of extracting the attribute information from the printer data.

According to one aspect of the invention, attribute information to be added to the printer data transmitted from a printer driver to a printer is expressed based on the color information. The printer driver appropriately changes the attribute information expressed based on the color information of so that the attribute information, which is expressed based on the color information, takes an appropriate value, and sends the printer data to the printer. Upon receipt of the printer data, the printer extracts the attribute information X based on the color information of the printer data as received, and executes the printing according to the information. Accordingly, in the invention, the attribute information is buried in the color information transmitted from the printer driver. Even if the attribute information is added to the printer data, the amount of the printer data is equal to that of the printer data when it consists of the color information. In this respect, there is no chance of increasing the amount of the data (the data amount increase is inevitable in the conventional technique). Further, the color error, caused by the changing of the color information for the purpose of burying attribute information, may be minimized if the colors to be changed and changing quantity are appropriately selected.

According to another aspect of the invention, there is provided a printer system having a driver section for generating color information on each dot from data on an object to be printed, and forms printer data containing the color information, and a printer section for image processing the print data in a predetermined manner, and executing the printing of the object to be printed, wherein the driver section appropriately changes the color information in accordance with attribute information for specifying the image processing so that the attribute information is expressed based on color information on each dot, and the printer section executes the printing of the printed object in accordance with attribute information expressed based on color information transmitted from the driver section.

In a preferred embodiment, the driver section appropriately changes the color information such that when the data amount of the attribute information consists of n bits, the attribute information is expressed by the remainder produced when the total value of the data representative of color information on each dot is divided by $2^n$.

In another preferred embodiment, in a case where the driver section changes the color information, the color information on each dot is expressed by data on a plurality of colors, the plural-color data is successively changed in predetermined order.

In yet another embodiment, in a case where the driver section changes the color information, the color information on each dot, and the color information is expressed by data on a plurality of colors, the plural-color data are changed so that the plural-color data are uniform in the change quantity.

In a further embodiment, in a case where the driver section changes the color information, the color information on each dot is expressed by data on a plurality of colors, the data representative of the lowest gradation or the data of the highest gradation is not changed.

According to another aspect of the invention, there is provided a printer driver program which generates color information on each dot from data on an object to be printed, forms printer data containing the color information, and sends the print data to a printer for executing the printing of the object to be printed, wherein the printer driver program causes a computer to execute a procedure to appropriately modify the color information in accordance with attribute information for specifying an image processing executed by the printer so that attribute information for specifying the image process is expressed based on the color information on each dot.

In a preferred embodiment, the driver section appropriately changes the color information such that when the data amount of the attribute information consists of n bits, the attribute information is expressed by the remainder produced when the total value of the data representative of color information on each dot is divided by $2^n$.

According to a further aspect of the invention, there is provided a printer which image processes print data containing color information on each dot generated from data representative of an object to be printed, in a predetermined manner, and executes the printing of an object to be printed, receives print data containing color information, which is appropriately modified by the print driver so that the attribute information for specifying the image processing is expressed based on color information on each dot, and extracts the attribute information from the received printer data by use of the color information, and executes the printing of the printed object in accordance with the extracted attribute information.

In a preferred embodiment, the printer data contains the color information, which is modified such that when the data amount of the attribute information consists of n bits, the attribute information is expressed by the remainder produced when the total value of the data representative of color information on each dot is divided by $2^n$.

Further objects and features of the invention will be apparent when carefully reading the description of the preferred embodiments.

DETAILED DESCRIPTION OF THE PREFERRED EMBODIMENTS

Figure 1:
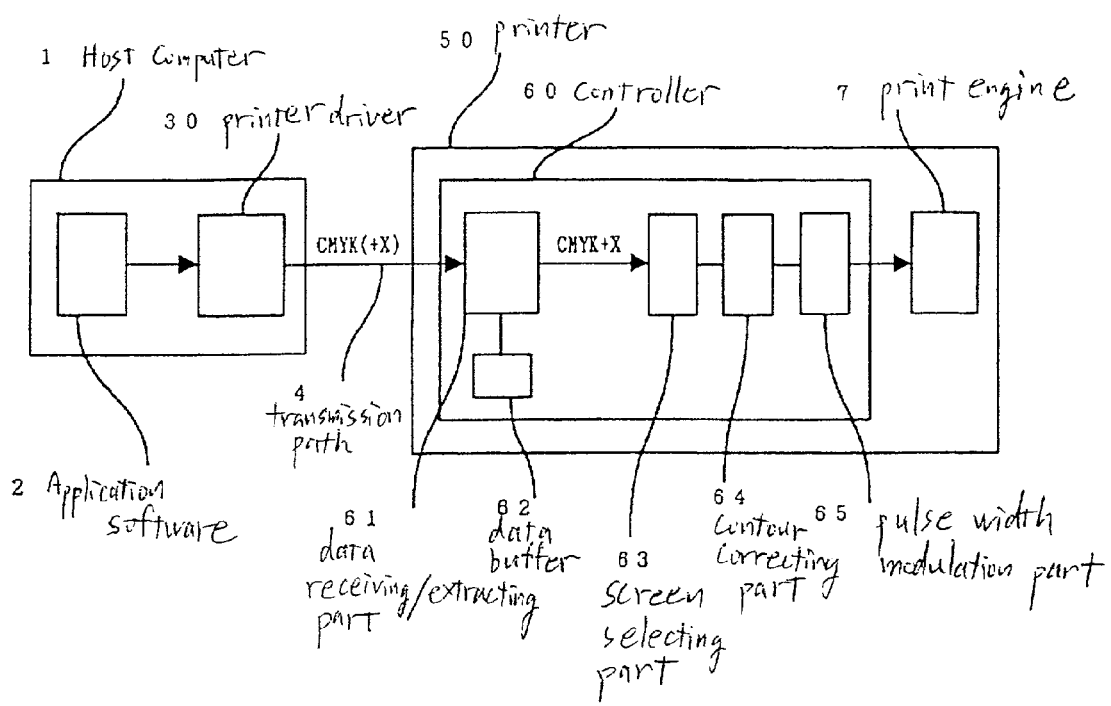
FIG. 1 is a block diagram showing an arrangement of a printer system into which the present invention is incorporated.

The preferred embodiments of the present invention will be described with reference to accompanying drawings. It should be understood that the present invention is not limited to the embodiments to be described hereunder. Throughout the drawings, like or equivalent portions are designated by like reference numerals and symbols.

Figure 6:
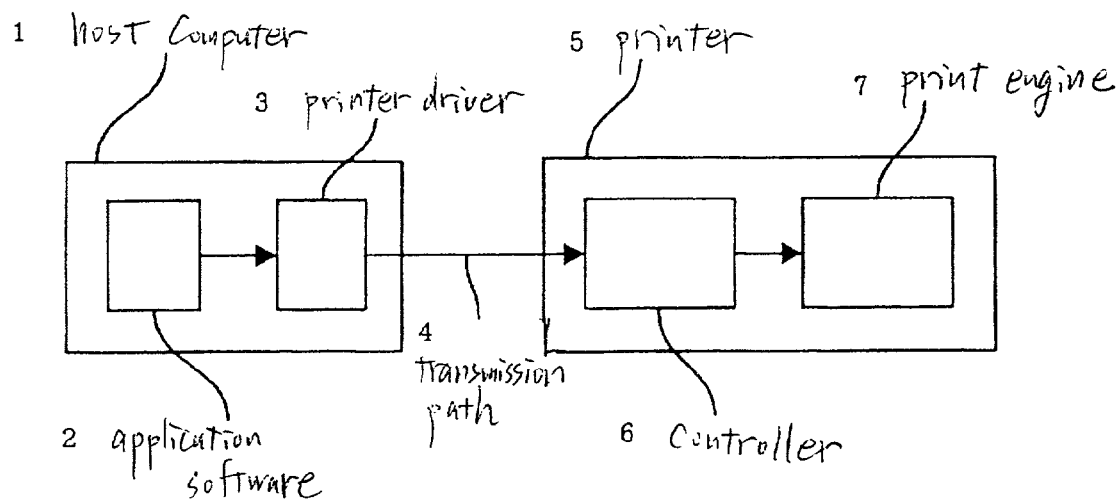
FIG. 6 is a block diagram showing a conventional printer system including host computer for sending a print request, and a printer for executing the printing in response to the print request.

FIG. 1 is a block diagram showing a printer system constructed according to the present invention. As shown in FIG. 1, a system configuration of the embodiment is similar to the conventional one described referring to FIG. 6. In FIG. 1, an arrangement of controller 60 is also illustrated.

Also in the printer system of the embodiment, a printer 50 responds to a print request from a host computer 1 and prints. During this process, in the host computer 1, application software 2 and printer driver 30 mainly function. The application software 2 contains application programs for generating or selecting an object to be printed, such as word processing software, image edit software, and various types of browsers. As described above, the printer driver 30 contains interface programs provided for various printers. The printer driver responds to a print request issued through the application software 2, generates printer data for a printer 50 corresponding to the print request, and sends the generated one. It is noted that the printer driver 30 of the embodiment has the following features. Also when the attribute data mentioned above (X in the figure) must be added to the printer data, the attribute information is buried in color information (CMYK in the figure) in a manner to be described later, whereby an amount of the printer data is not increased.

The printer 50 generally comprises the controller 60 and a print engine 7, as in the conventional printer. The controller 60 includes a data receiving/extracting part 61, a data buffer 62, a screen selecting part 63, a contour correcting part 64, and a pulse width modulation part 65. The data receiving/extracting part 61 is preferably constructed by using software techniques, and it receives printer data through the transmission path 4 and loads the printer data into the data buffer 62. Usually, the data is stored in compression form. Thereafter, it receives the data from the data buffer 62 in synchronism with the operation of the print engine 7, and extracts the data, and transmits the extracted one to a downstream step. The data receiving/extracting part 61 in the embodiment has a function to extract the attribute information, which is buried in the color information by the printer driver 30, and transfers the color information and the extracted attribute information ((CMYX+X in figure) to the next step.

The screen selecting part 63, the contour correcting part 64 and the pulse width modulation part 65 are preferably constructed by using hardware techniques. Those hardware components successively executes a binarizing process, a contour processes and the like in accordance with color information and attribute information from the data receiving/extracting part 61 in synchronism with the operation of the print engine 7, and finally issues a print command to the print engine 7. In response to the print command, the print engine 7 executes actual printing.

As seen from the foregoing description given in connection with FIG. 1, in the printer system of the embodiment, the printer driver 30 and the printer 50 have respectively the function of burying attribute information to be added to the printing data into color information, and the function to extracting the buried attribute information. With such technical features, the printer system realizes the addition of attribute information to the printer data without increasing the data amount.

Description will be given about how the printer driver 30 buries attribute information into the printer data, and how the data receiving/extracting part 61 of the printer 50 extracts attribute information from the printer data.

Figure 2:
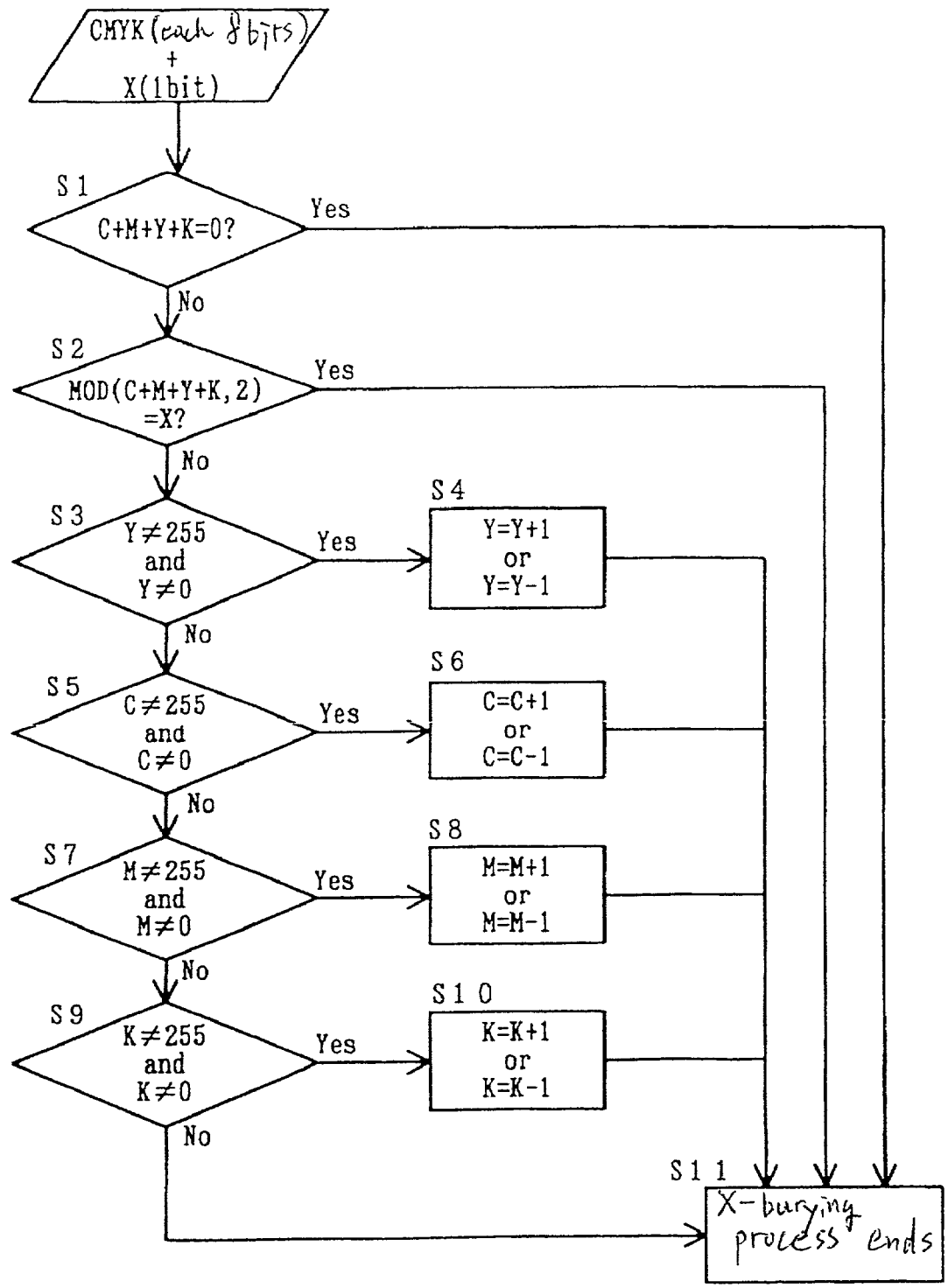
FIG. 2 is a flow chart showing a process of burying attribute information to be added to the printer data, which is carried out by the printer driver 30, in a case where the information amount of the attribute information is 1 bit.

FIG. 2 is a flow chart showing a process of burying attribute information to be added to the printer data, which is carried out by the printer driver 30, in a case where the information amount of the attribute information is 1 bit. In this case, the color information is expressed by four elements (colors) C, M, Y, K, each element consisting of 8 bits. In the figure, variables C, M, Y, K represent the data of those four elements, and each takes any of the values, 0 to 255. A variable X in the figure represents attribute information to be added, which consists of one bit, i.e., 0 or 1. The 1-bit attribute information may be information to select either of two types of screen, which is used for a binarizing process carried out by the printer 50, information indicating as to whether or not the contour process is required, or other information.

In the attribute information burying method presented here, the 1-bit attribute information X is expressed depending on whether the total value of color information for each dot, viz., the total value of the variables C, M, Y, K, is an even or odd number. Specifically, if the total value is an even number, the attribute information of the dot is 0. If the total value is an odd number, the attribute information of the dot is 1. When the total value indicates attribute information, which is different from the attribute information to be added to the dot, the color information is changed by "1" so that the total value of the color information indicates appropriate attribute information. Accordingly, in this method, the attribute information X may also be expressed with only the color information, and there is no need of providing a new data area for the attribute information X in the printer data.

As shown in FIG. 2, in the printer driver 30, color data C, M, Y, K of the respective elements and attribute information X (0 or 1) are prepared for each dot in the printer driver 30.

Then, the total value of color data C, M, Y, K is computed, and if it is 0, the burying process of attribute information X ends (step S11 in FIG. 2). If it is not 0, the program advances to the next step (S1 in FIG. 2). When the computed total value is 0, the color of the dot is white, and normally, the printer 50 does not operate for coloring, and hence attribute information for controlling the printer operation may take either of them. Accordingly, there is no need of burying the attribute information into the printer data, as described above.

In a case that the total value above is not 0, a remainder (MOD (C+M+Y+K, 2)), which is produced when the total value is divided by two, is obtained and the remainder is compared with the attribute information X (step S2 in FIG. 2). If the remainder is equal to the attribute information X, the color information expresses, as intact, the given attribute information X correctly, and there is no need of changing the color information. Therefore, the process of burying attribute information ends (step S11 in FIG. 2).

If the remainder is different from the attribute information X (No to the step S2 in FIG. 2), it is necessary to change the given color information by "1" in order that the total value correctly expresses the attribute information X. To this end, the process (steps S3 to S10 in FIG. 2) is executed. If the value of Y is neither 255 nor 0 (Yes to the step S3 in FIG. 2), it is changed by "1" (to add 1 to or to subtract 1 from the value of Y) (step S4 in FIG. 2), then the burying process ends (step S11 in FIG. 2). If the value of Y is 255 or 0 (No to step S3 in FIG. 2), the value remains unchanged, and a process to change the value of C is executed, and a process as in the case of Y is carried out (steps S5 and S6 in FIG. 2).

In a case that the value C is not changed (No to the step S5 in FIG. 2), a process to change the value of M is executed (steps S7 and S8 in FIG. 2). When the value of M is not changed (No to the step S7 in FIG. 2), a process for changing the value of K is executed (steps S9 and S10 in FIG. 2). Thus, the value of one of colors is changed by "1" so that the total value of the color information expresses attribute information X. When the value of K is also not changed (No to the step S9 in FIG. 2), the burying process ends without changing none of the color information in value (step S11 in FIG. 2). In this case (No to the step S9 in FIG. 2), the total value of color information (the remainder when it is divided by 2) does not express the given attribute information X correctly. Such a case rarely occurs, however. Accordingly, attempt of burying the attribute information X is abandoned.

In this way, the attribute information burying process is carried out in the printer driver 30. In the case mentioned above, when the color information is changed (steps S3 to S10 in FIG. 2), the colors to be changed are selected in the order of Y, C, M and K. The changing of the colors in this order will little affect the printing, and hence the use of this order will suppress and minimize an adverse effect by a color information error which will be caused by the color information changing. If required, the color to be changed may be selected by using random numbers every color changing, instead of using the color selecting order mentioned above.

In the attribute information burying process, when the color information is changed, if the value of each color is "0", the process inhibits the color information from being changed (steps S3, S5, S7 and S9 in FIG. 2). The reason for this is that to change the color value from "0" to "1" means to color a position not having a color, and this is undesirable in both the process and the printing quality.

Similarly, as in the case of FIG. 2, when the colors are each 255 in its value, the color information is not changed (steps S3, S5, S7, S9 in FIG. 2). A state that the color value is 255 means that the element is solidly painted. This state occurs when an object to be printed is a character or the like. In this state, usually, a contour correction process or the like is used for securing attractive appearance. Accordingly, the changing of the color value from 255 to 254 implies that the contour correction or the like is not performed. The effect by the color value change is great and hence not preferable. More strictly, the incremental changing of the color value from 254 to 255 is also not preferable since unnecessary contour correction will be executed automatically. For this reason, a condition that the color value is not 254 may be added to the conditions to determine whether or not the color information is to be changed (steps S3, S5, S7, S9 in FIG. 2).

Figure 3:
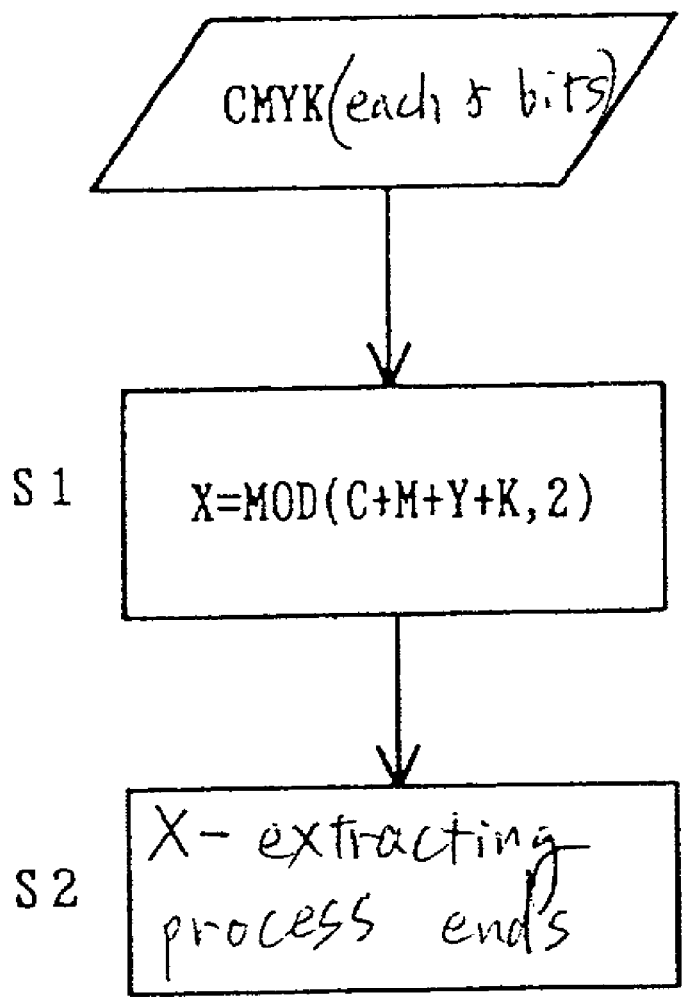
FIG. 3 is a flow chart showing a process for extracting the attribute information from the color information when the buried attribute information is 1 bit long.

FIG. 3 is a flow chart showing a process for extracting the attribute information from the color information containing the attribute information buried as described above, which the process is carried out in the data receiving/extracting part 61 of the controller 60 having received the printer data. As described above, the printer driver 30 sends only the color information of C, M, Y, K (each consisting of 8 bits) as printing data to the printer, apparently. According to the method of expressing the 1-bit attribute information X, the data receiving/extracting part 61 of the controller 60 obtains a remainder (MOD (C+N+Y+E, 2) ) produced when the total value of the color information received is divided by 2, and uses its value as attribute information X (step S1 in FIG. 3), and ends the process of extracting the attribute information X (step S2 in FIG. 3). The attribute information X extracted is transferred to a downstream process and is processed according to its value.

As described in connection with FIGS. 2 and 3, the 1-bit attribute information is expressed by a value of the remainder produced when the total value of the color information is divided by 2, viz., depending on whether the total value of the color information is an even or odd number, where by the 1-bit attribute information is buried in the color information, and the attribute information maybe transmitted without any increase of the data amount.

In the above-mentioned case, the color information to be transmitted from the printer driver 30 to the printer 50 is expressed in C, M, Y, K. Also when the color information is expressed in R, G, B, the attribute information may likewise be buried and extracted. To change the color information, in the case of R, G, B, the colors that are expressed by 256 gradations×3 elements are shifted by one in value. This change of color value presents a great effect when comparing with the case of C, M, Y, K in which 256 gradations×4 elements.

Figure 4:
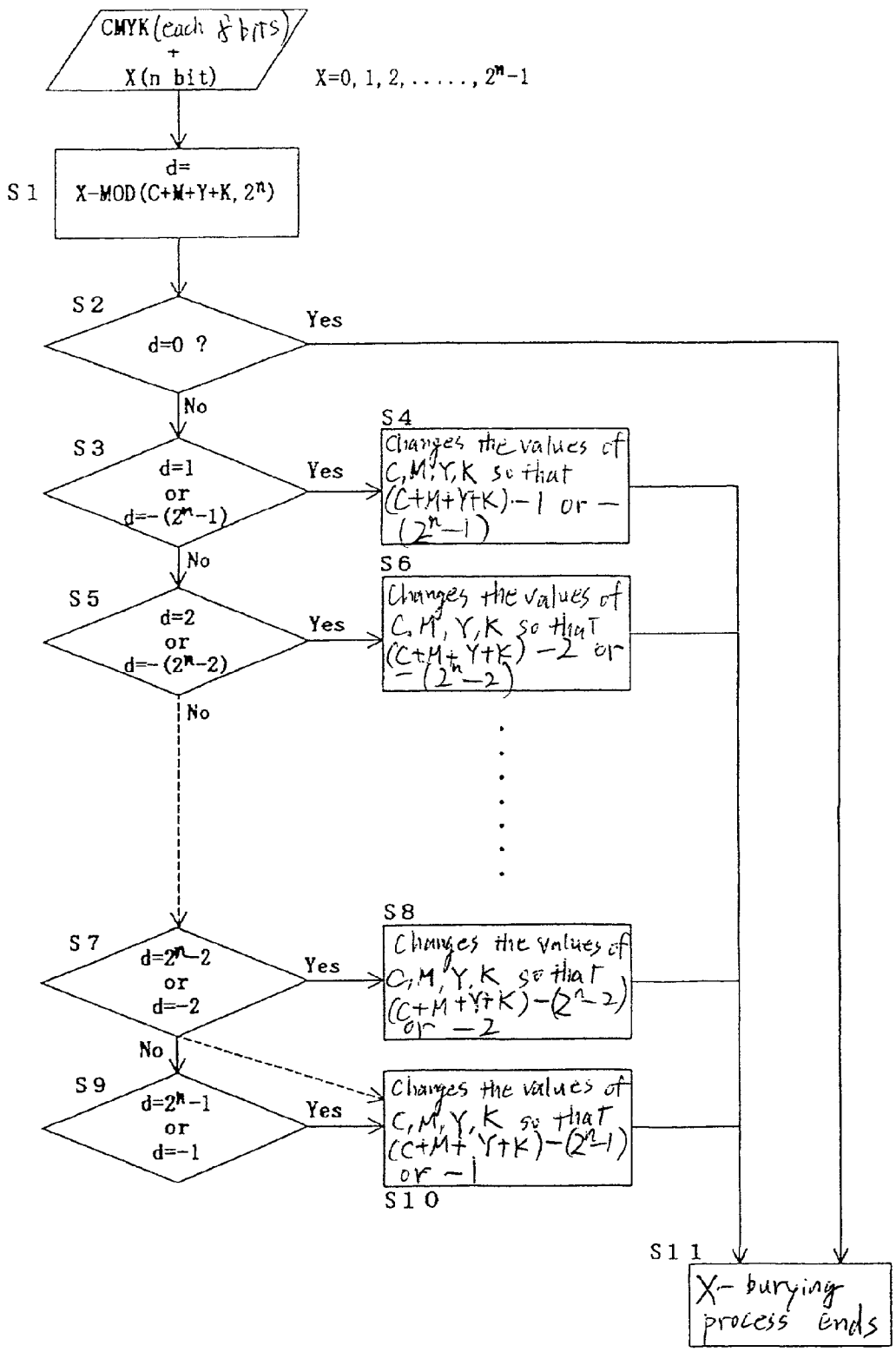
FIG. 4 is a flow chart showing a process of burying the attribute information of two or more bits.

Next, description will be given about a method of burying and extracting attribute information to be added, which consists of two bits or larger. FIG. 4 is a flow chart showing a process of burying the attribute information of two or more bits, which is executed by the printer driver 30. Also in this case, the C, M, Y, K color information are each expressed by eight bits, and the attribute information X consists of n bits and the values of X are 0, 1, 2, . . . , $2^n-1$. The method to be described hereunder is to bury the attribute information into the color information in a manner that n-bit attribute information is expressed by a remainder produced by dividing the total value of color information by $2^n$. In a specific example where the attribute information consists of two bits, a value of the attribute information is expressed by a remainder (=0, 1, 2, 3) produced when the total value of the color information is divided by $2^2(=4)$.

To start with, upon receipt of the color information and the attribute information X, the printer driver 30 computes a difference "d" between the attribute information X and a remainder (MOD (C+M+Y+K, $2^n$)) obtained through the calculation of dividing the total value of the color information by $2^n$ (step S1 in FIG. 4). Then, the printer driver checks as to if the difference "d" is "0" (step S2 in FIG. 4). If it is 0, the printer driver ends the attribute information burying process (step S11 in FIG. 4). In this case, the remainder produced through the calculation of dividing the total value by $2^n$ correctly expresses the given attribute information X, and hence, no further processing is required.

If the difference "d" is not0 (No to the step S2 in FIG. 4), viz., the remainder obtained through the calculation of dividing the total value by $2^n$ incorrectly expresses the attribute information X, the printer driver changes each color information in accordance with the difference "d" so that the remainder obtained through the calculation of dividing the total value by $2^n$ correctly expresses the attribute information X. Specifically, ($2^n-1$) process steps are executed depending on the value of the "d" as shown in the steps S3, S5, S7, s9 in FIG. 4. In each step, the values of C, M, Y, K are changed so that the total value of the color information is increased by the value of "d" (steps S4, S6, S8, S10 in FIG. 4). In any case, following the changing of the color information, the process of burying the attribute information X ends (step S11 in FIG. 4).

In this way, the attribute information, even if it is n bits long, may be buried into the color information, and the printer driver 30 sends only the color information (32 bits) of C, M, Y, K to the printer 50, apparently.

Various ways may be taken for changing the color value of C, M, Y, K. An example way is to change the color value in the step of "1" in the order of the colors shown in FIG. 2 till its required quantity is reached. Another example is to select the colors one by one in a random fashion, and to change the color value in the step of "1" till its required quantity is reached. In either case, it is essential that the color information error by the color value changing has the least adverse effect on the print result. In particular when the changing quantity is large, it is preferable to uniformly change the color values of those colors. In an example where n=3 and d=4, the color value of each of the colors C, M, Y, K is incremented by "1". As already described in connection with FIG. 2, in the case where the value of each color is "0", "255" or the like, a condition that those color values are not changed may be additionally used.

In FIG. 4, the step S9 is used for ease of explanation. Actually, the step 9 is deleted and a flow indicated by a broken line in the figure (No to the step S7→ the step S10) may be used.

Figure 5:
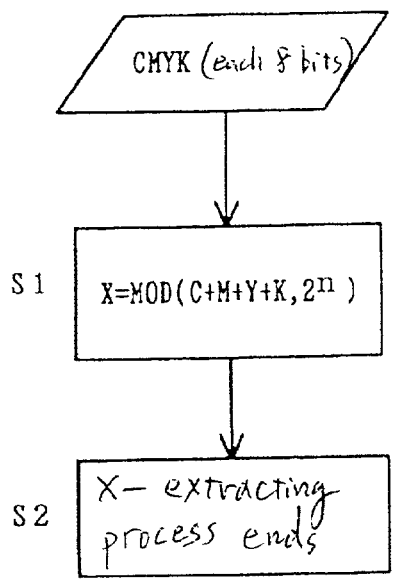
FIG. 5 is a flow chart showing a process for extracting the attribute information from the color information into which the attribute information of n bits long is buried.

FIG. 5 is a flow chart showing a process for extracting the attribute information from the color information into which the attribute information of n bits long is buried. The process shown in FIG. 5 is similar to that in FIG. 3. The data receiving/extracting part 61 of the controller 60 receives the printer data as the data of C, M, Y, K, uses a remainder resulting from the calculation of dividing the total value of the color information by $2^n$, and the attribute information extracting process ends (step S2 in FIG. 5).

As described above in connection with FIGS. 4 and 5, the attribute information, even if it is 2 bits or longer, may be buried into the color information, and the attribute information may be transmitted without any increase of the data amount. The color error, caused by the changing of the color information for the purpose of burying attribute information, may be minimized if the colors to be changed and changing quantity are appropriately selected.

In the process described with reference to FIGS. 4 and 5, if the attribute information amount n is 1 bit, the process shown in FIGS. 2 and 3 is obtained. Also in the process of FIGS. 4 and 5, the color information may be expressed in the form of R, G, B in place of C, M, Y, K.

As described above, the printer system of the invention is capable of transmitting the attribute information from the printer driver to the printer without any increase of data amount. Even when the attribute information is added to the printer data, there is no chance of increasing the load to the data transmission and storage systems.

It should be understood that the present invention is not limited to the above-mentioned embodiments, but it may variously be modified, altered, and changed within the true spirits of the invention.

For the attribute information burying method, one of the colors R, G, B, for example, the color B of 8 bits, is used, and the color information is assigned to the 7 high-order bits of the color B, and the attribute information X is assigned to the LSB.

As seen from the foregoing description, the attribute information is buried in the color information transmitted from the printer driver. Even if the attribute information is added to the printer data, the amount of the printer data is equal to that of the printer data when it consists of the color information. In this respect, there is no chance of increasing the amount of the data (the data amount increase is inevitable in the conventional technique). Further, the color error, caused by the changing of the color information for the purpose of burying attribute information, may be minimized if the colors to be changed and changing quantity are appropriately selected.

What is claimed is:

1. A printer system comprising:
    a driver section for generating color information on each dot from data on an object to be printed, and forming printer data containing the color information; and
    a printer section for image processing said printer data in a predetermined manner, and executing printing of said object to be printed,
    wherein said driver section appropriately changes said color information in accordance with attribute information for specifying said image processing so that said attribute information is buried in color information on each dot, and
    wherein said printer section extracts the attribute information buried in the color information transmitted from said driver section and executes the printing of said object to be printed in accordance with the extracted attribute information.

2. A printer system according to claim 1, wherein said driver section appropriately changes said color information such that when the data amount of said attribute information consists of n bits, said attribute information is expressed by the remainder produced when the total value of the data representative of color information on each dot is divided by $2^n$.

3. A printer system according to claim 1, wherein in a case where said driver section changes said color information, said color information on each dot is expressed by data on a plurality of colors, said plural-color data is successively changed in predetermined order.

4. A printer system according to claim 1, wherein in a case where said driver section changes said color information, said color information on each dot is expressed by data on a plurality of colors, said plural-color data are changed so that said plural-color data are uniform in the change quantity.

5. A printer system according to claim 1, wherein in a case where said driver section changes said color information, said color information on each dot is expressed by data on a plurality of colors, the data representative of the lowest gradation or the data of the highest gradation is not changed.

6. A printer driver program embodied on a computer readable medium which generates color information on each dot from data on an object to be printed, forms printer data containing said color information, and sends said printer data to a printer for executing printing of said object to be printed, said printer driver program causing a computer to execute a procedure to appropriately modify said color information in accordance with attribute information for specifying an image processing executed by said printer so that attribute information for specifying said image processing is buried in color information on each dot.

7. A printer driver program according to claim 6, wherein said driver section appropriately changes said color information such that when the data amount of said attribute information consists of n bits, said attribute information is expressed by the remainder produced when the total value of the data representative of color information on each dot is divided by $2^n$.

8. A printer which image processes printer data containing color information on each dot generated from data representative of an object to be printed, in a predetermined manner, and executes the printing of the object to be printed, receives the printer data containing color information, which is appropriately modified by a print driver so that attribute information for specifying image processing is buried in the color information on each dot, and extracts said attribute information from said received printer data by use of said color information, and executes the printing of said object to be printed in accordance with said extracted attribute information.

9. A printer according to claim 8, wherein said printer data contains said color information, which is changed such that when the data amount of said attribute information consists of n bits, said attribute information is expressed by the remainder produced when the total value of the data representative of color information on each dot is divided by $2^n$.

* * * * *